United States Patent [19]

Lautner et al.

[11] 4,071,787
[45] Jan. 31, 1978

[54] WELDED STATOR FOR ELECTRIC MOTORS

[75] Inventors: Max E. Lautner, Watertown; Bernard J. West, Chaumont, both of N.Y.

[73] Assignee: Gould Inc., Rolling Meadows, Ill.

[21] Appl. No.: 692,448

[22] Filed: June 3, 1976

[51] Int. Cl.² ............................................. H02K 15/00
[52] U.S. Cl. ...................................... 310/42; 310/172; 310/217
[58] Field of Search .................. 310/172, 92, 216–218, 310/258, 259, 162–165

[56] References Cited

U.S. PATENT DOCUMENTS

| 2,790,918 | 4/1957 | Goran | 310/217 |
| 3,365,687 | 1/1968 | Capell | 310/217 X |
| 3,443,137 | 5/1969 | McElroy | 310/216 |
| 3,866,014 | 2/1975 | Waller | 310/217 X |

Primary Examiner—Donovan F. Duggan
Attorney, Agent, or Firm—Bruns & Jenney

[57] ABSTRACT

A two part laminated stator in which a ring portion, bearing shading coils, has a pair of spaced parallel legs projecting therefrom, each leg end being adapted for a welded connection with a corepiece end, the corepiece being adapted to be inserted in an axially extending hole in a bobbin on which a coil has been wound. Each leg end and each polepiece end is shaped to have a complementary line of contact shaped for full line contact without interference as the corepiece, bearing the wound bobbin, and the leg ends are pressed together in opposite directions parallel to the line in which the legs project. The two parts and the laminations of each part are then secured together along a strip weld across the outer edge of the laminations at the outer end of the line of contact for each leg and each polepiece end.

8 Claims, 12 Drawing Figures

WELDED STATOR FOR ELECTRIC MOTORS

BACKGROUND OF THE INVENTION

This invention relates generally to two part stators of laminated construction such as the cores and stators used in the construction of transformers and sub-fractional horse-power electrical motors. More particularly, this invention relates to a laminated core which, due to the necessity of applying an electrical winding thereto, must consist of two separate portions which are fitted complementally together after one of the portions has received the electrical winding.

Prior constructions have been attended by disadvantages which it is the object of this invention to overcome. The known steps in constructing a laminated magnetic core from a plurality of identical, two part laminae are: (1) dividing the two-part laminae into two stacks, all of the first parts in one stack and all of the second parts in the other, (2) riveting or otherwise securing the stacks together into rigid laminated portions, (3) wrapping one portion with the requisite electrical winding, and (4) press-fitting together under high pressure.

Although the laminae of the two parts are often stamped in assembled relation simultaneously from the same piece of metal, there are nonetheless edge contortions and burrs which interfere in such a way that considerable pressure must be exerted to force the two stacks of laminations together ensuring that, once assembled, the assembled magnetic core parts will not part. The burred or contorted edges of the laminae during press-fitting causes displacement of material, called scouring, to take place. Often scouring is caused merely by the high pressures involved. The material displaced by scouring often bridges across adjacent laminae and forms cross-paths for magnetic flux causing undesirable eddy currents or displaced material accumulates between the two assembled parts and prevents surface to surface contact at some locations forming air gaps which, of course, introduces reluctance into the magnetic gap.

Also, rivetting or securing the two parts or stacks together may cause similar reluctance and eddy currents in the stacks or assembled stator.

In certain sub-fractional horsepower electrical motors, the stator comprises a ring portion and a field core portion, both laminated, the latter generally offset to one side of the ring portion. The ring portion has a circular opening therethrough, within which the rotor is adapted to rotate, and two integral substantially parallel legs extending therefrom to one side or end. At the end of the legs a core-piece, adapted to be surrounded by a field coil, is joined at each end to a respective leg. The legs and corepiece comprise the core portion of the stator.

Heretofore, many such stators had at the inside of the leg end a straight-sided recess in which a respective end of a straight-ended corepiece was press-fitted after a coil bobbin was wound with a field coil winding, the corepiece extending through an aperture through the drum of the bobbin. The corepiece ends and the mating sides of the leg recesses extended in a straight line, the lines converging outwardly at the same acute angle to the midline of the stator. Both the ring portions and legs and the corepiece each were laminated and the laminations were secured together before assembling by rivets or otherwise.

In other prior art stators the leg ends terminated in projecting rounded portions and the inside ends of the corepiece had mating rounded recesses into which the projecting leg portions were pressed after a field coil had been wound on a bobbin mounted around the corepiece.

In both these types of stators, scouring was apt to occur when the leg piece ends were force-fitted to the corepiece ends.

SUMMARY OF THE INVENTION

In the stator of the invention, which is of shaded coil construction, the stator comprises a ring portion which forms the opposite poles of the stator. The ring portion has two spaced parallel legs integral with the ring portion projecting from the ring portion and each connected to an opposite pole of the stator. The legs form part of the field core portion and are adapted to be secured to the other field coil portion, the corepiece portion after the latter portion has been inserted in a hole extending axially of the drum or spindle or center portion of a bobbin after the coil has been wound on the bobbin.

The ring portion, bearing the shading coils and the integral leg portions, and the corepiece portion are both laminated. Instead of force-fitting the ring portion integral leg portions into holding engagement with the corepiece ends as was usual in prior art stators, this invention contemplates welding the leg ends of the one portion to the corepiece ends of the other portion along a continuous strip weld across the edges of the laminations at the outer ends of a line along which each leg joins its respective end of the corepiece. This strip weld not only joins the leg end to its respective corepiece end but also joins the laminations of each part together.

To hold the laminations of the ring portion and their integral legs together in proper alignment before welding, pressure is applied to the laminations assembled in an appropriate jig or fixture. The shading coils, having been assembled to the ring portion, and formed and welded, are crushed against the outer laminations of the ring portion and thus secure the laminations together in assembled relation after removal from the fixture.

After the coil bobbin has been wound and the assembled corepiece inserted in the axial hole therethrough, the corepiece laminations are held together by the coil bobbin and, held together in assembled relation in another appropriate fixture, are held against the mating portions of the legs. The corepiece ends extend beyond the ends of the coil bobbin and appropriate pressure may be applied to the legs and the mating corepiece ends in the fixture while the welds are made.

It has been found that the stator legs and the ends of the corepiece may be formed with a suitable line of contact between leg ends and corepiece ends so that firm contact between the legs and mating corepiece ends prior to welding may be obtained by minimal pressure, typically 50 lbs., without press fitting and interlocking the parts.

Each leg end is provided with a line of contact for mating with a reversely similar and complementary line of contact on its corresponding polepiece end. Where the line of contact between leg end and polepiece end is arcuate or partially curved, the end portion of one part necessarily has a projection and the end portion of the other part has a complementary curved socket. At least one end of the polepiece portion must be no wider, measured longitudinally of the motor, than the center portion of the polepiece engaged in the bobbin axial hole so that the polepiece may be inserted in the hole. In choosing the line of contact, if it is curved, care is taken to ensure that the curved socket portion toward which the curved projecting portion of the other part is advanced is continuously curved and open to provide an opening into which the projection may be advanced without contact until final contact along the whole line of contact is made.

Where the line of contact contains a straight portion, care is taken to keep the straight portion at an angle of between 5° and 90° to the direction in which the legs project from the ring portion so that no contact is made along the line of contact until contact is made along the whole line of contact. In this manner scouring is prevented and contact between the parts is made along the whole line of contact with minimum pressure applied to the parts.

DESCRIPTION OF THE PREFERRED EMBODIMENT

Figure 1:
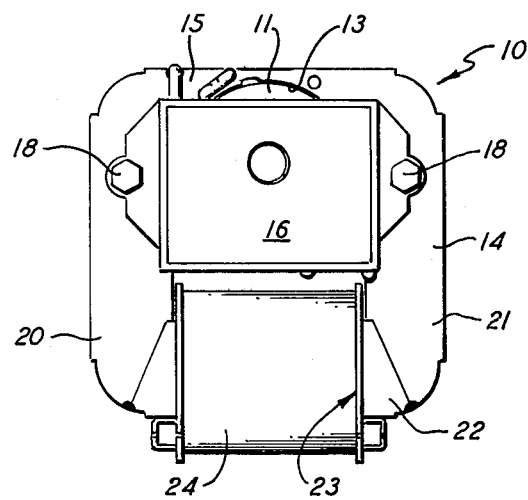
FIG. 1 is a side elevational view of an electric motor according to the invention.
Figure 2:
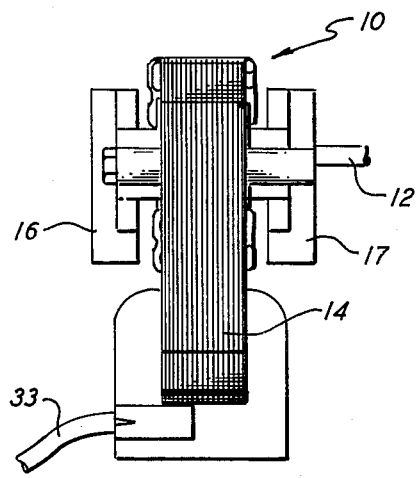
FIG. 2 is a side edge elevational view thereof, the parts being rotated 90° and certain parts being shown fragmentarily.

Referring to FIGS. 1 and 2, a small, shaded pole, sub-fractional horsepower electric motor 10 has a rotor 11 mounted on a shaft shown fragmentarily at 12 in FIG. 2. The rotor 11, a "squirrel cage" induction type rotor with suitable windings not shown, rotates within an orifice 13 through the stator 14, the portion of the stator about the orifice 13 being termed the ring portion 15 of the stator.

Shaft 12 on either side of rotor 11 is supported in bearings, not shown, mounted in bearing supports 16 and 17 secured by bolts 18 through appropriate holes 19 through the stator located so that the rotor is appropriately spaced from its orifice 13.

Figure 3:
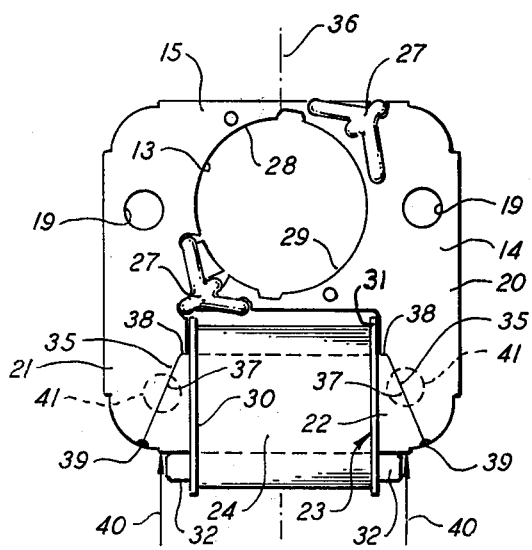
FIG. 3 is a side elevational view of the stator and field coil assembly of the motor shown in FIG. 1, the parts being rotated 180° therefrom.
Figure 4:
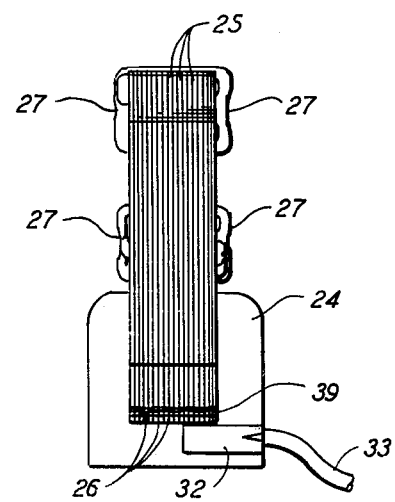
FIG. 4 is a side edge elevational view of the parts shown in FIG. 3, the parts being rotated 90° therefrom.

Referring now to FIGS. 3 and 4, the stator 14 is seen to comprise the ring portion 15 around orifice 13 and stator leg portions 20 and 21 integral with ring portion 15 but forming portions of the field core portion along with the polepiece portion 22 which is inserted in a rectangular hole through the bobbin or coil support member 23 on which the field coil 24 is wound.

Ring portion 15 and the integral legs 20 and 21 and corepiece 22 are laminated as seen in FIGS. 2 and 4, the laminations 25 and 26 thereof being contiguous but not integral with laterally adjacent laminations, as is usual in such stator-core parts for providing magnetic flux in each lamination layer.

Copper shading coils 27 in appropriate grooves through the edges of the laminations 25 divide the stator ring portion 15 into diametrically opposite poles 28 and 29, the leg 21 being integral with the first and leg 20 being integral with the latter. It will be noted that holes 19 for the bolts 18 are larger than the bolts themselves to allow for inwardly projecting annular projections from the bearing supports 16 and 17 for accurately locating the bearing supports with respect to orifice 13.

The field coil support or bobbin 23 has a centrally located rectangular hole through its spool, not shown, through which the polepiece is inserted, as shown, prior to assembling the polepiece to the legs 20 and 21, the bobbin having end flanges 30 and 31 and the fine wire windings of the field coil being covered with a wrapped around sheet of protective material at 24, adhesively secured. Each flange 30 and 31 carries an integral tubular projection 32 in which insulated lead wires 33 may be secured after they are connected to the end wires of the coil winding as is usual with such bobbins.

The legs 20 and 21 each has a recess, straight sided at 35 and facing inward, the straight sides 35 of each leg being inclined to diverge outwardly at the same acute angle to the midline 36 of the stator. Each end of the polepiece has a straight end 37 divergently inclined to the midline 36 at the same angle as the sides 35 of the recesses in the legs 20 and 21 so that the ends 37 of the polepiece mate with the recesses straight side 35. The other side 38 of each recess is located so that the outer ends of the recesses and of the polepiece straight sided ends terminate at 39,39.

It will be understood that the pile of selected laminae 25 are first piled and the shading coils 27,27 are assembled and joined by welding as shown. Then the joined laminae are held in a jig or fixture which aligns their top and side edges and bottom ends vertically to the plane of the paper in FIG. 3 and then pressure is applied to the top and bottom surfaces of the stack as viewed in FIG. 3 in directions normal to the plane of the paper to compress the shading coils against the outer laminae of the pile. This holds the laminae 25 positioned for the next step.

The laminae 26 of the polepiece 22 are then stacked and similarly aligned in a vertically aligned stack. The now-wound bobbin 23 is then slipped around the stack of aligned laminae 26 securing the laminae in assembled relation.

The same, or another fixture, to vertically align the top and sides of laminae 25 is then used to hold the laminae 25 in place while force is applied to the stack of laminae 26 in the direction indicated by the arrows 40 in FIG. 3, while forces in opposite directions normal to the surface of the paper in FIG. 3 are applied in the broken line areas denoted 41 in FIG. 3, to hold the two stacks of laminae vertically aligned.

For securing the two stacks of laminae 25 and 26 together, a weld 39,39 across the outer edges of the laminae at their point of abutment by running an electric or other welding torch along the outer edges of the laminae to melt the metal along a continuous strip weld, as shown. No other securing means need be provided.

Figure 5:
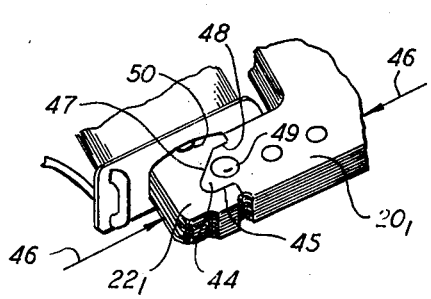
FIG. 5 is a fragmentary perspective view of a prior art electric motor showing the press-fitted joint between one stator leg and one end of the adjacent polepiece.

In FIG. 5 a similar joint between a stator leg $20_1$ and a polepiece end $22_1$ is fragmentarily shown. Leg $20_1$, as is the opposite leg $21_1$, not shown, is provided with an outwardly projecting, curved projection 44, the projection having a relatively long side 45 generally parallel to the arrows 46,46 denoting the direction in which press-fit force is applied for securing the laminated stacks 20, and 22, together.

The other side of projection 44 has a relatively long straight side 47 terminating in a relatively short straight side 48 extending in a direction generally parallel to the side 45. The laminations of stack 20 are secured together by rivets, one of which is shown at 49, and the laminations of stack 22 are similarly secured together by rivets, one of which is fragmentarily shown at 50.

It is pointed out that, aside from the objectionable securing together of the stacks by rivets at 49 and 50, when force is applied in the directions of the opposed arrows 46, there is objectionalbe scouring at the side 48 while the side 48 is engaged with its mating side in the recess formed in the polepiece 22, and the parallel other side 45 is engaged with its mating side of the recess.

This press-fit joint is shown and described in U.S. Pat. No. 3,443,137 to McElroy, issued May 6, 1969, in which assembly, pressure, denoted by arrows 46,46 above, was reduced to about two tons from a pressure of about four tons required in prior art joints.

Figure 6:
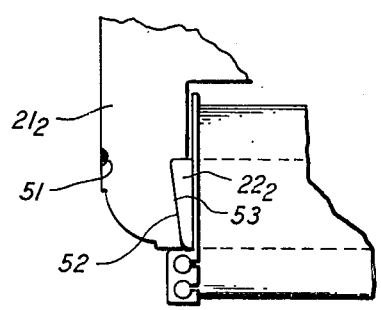
FIG. 6 is a fragmentary side elevational view of another prior art motor showing a similar press-fitted joint.

In FIG. 6, another prior art joint between a stator leg $21_2$ and a corepiece $22_2$ is fragmentarily shown, both the stator leg and corepiece being laminated. It will be noted that the laminations of the stator leg $21_2$ are held together by a strip weld at 51 across the edges of the laminations.

The leg $21_2$ is provided with a recess 52 having a straight side and corepiece $22_2$ is provided with straight sided ends at 53. Both the straight side of the recess 52 and the mating straight-sided end 53 of the polepiece are inclined at a small angle to the midline of the stator but the lines converge outwardly as shown. This necessitates the pressure for fitting polepiece and legs together to be applied in opposite directions normal to the plane of the paper in FIG. 6. This requires a high pressure substantially that which is estimated at four tons in the McElroy patent and the danger of scouring.

By applying pressure in the direction of the arrows 40 in FIG. 3 and providing divergent lines of contact between the polepiece ends and the leg recess sides as set forth above in the present invention, the press-fit pressure required is only about 50 pounds and scouring at the lines of contact is eliminated. Moreover, rivets are not used and welding is required at only two places, 39,39.

It will be apparent that the steps of assembling the corepiece portions and the leg portions as outlined above may be followed and the corepiece ends secured to the leg portion ends when no recess is provided in the leg portions and, in some cases, where the lines along which the polepiece ends and the leg portion ends are fitted together by low pressure are not straight lines but curved lines or partially straight and partially curved lines.

In each FIG. 7-12 inclusive leg ends and polepiece ends are shown. A bobbin 23 for coil 24 is shown and in each figure the position of holding pin 41 is indicated in broken lines.

Figure 7:
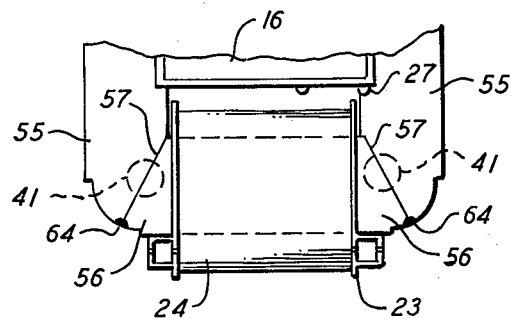
FIGS. 7–12, inclusive, are fragmentary views similar to the lower portion of FIG. 1, each showing an electric motor having a combined laminated stator ring portion and integral parallel leg portions, a field coil similar to that shown in FIGS. 1–4, and a cooperating laminated polepiece portion, each leg end portion and polepiece end portion being adapted to be secured together along continuous lines at whose outer ends the respective laminations are secured together by a continuous weld across the outer edges of the laminations.

In FIG. 7, no recess is provided in the leg portion ends 55 in that the recess at 38 in FIG. 3 for each leg is omitted and the straight line contact between leg portion ends 55 and polepiece portion ends 56,56 at 57 extends in a straight line from one leg side to the other and from polepiece side to the other, lines 57 diverging at an angle to the direction in which the legs 55 project from their ring portions 15, which is between 5° and 90°.

Figure 8:
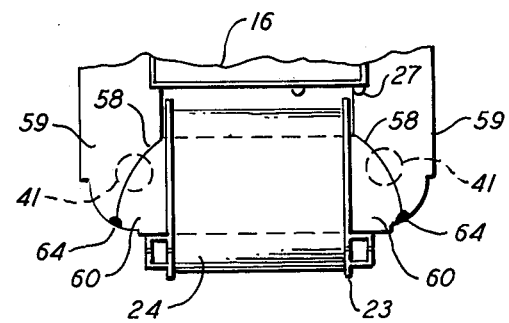

In FIG. 8 the lines 58 at which the leg ends 59 meet the polepiece ends 60 are curved but continuously diverge from one end of line 58 to the other. The curve of line 58 obviously could be in the other direction but the curve of line 58 is preferred since it leaves more room for the holding pins 41 spaced from bobbin 23.

Figure 9:
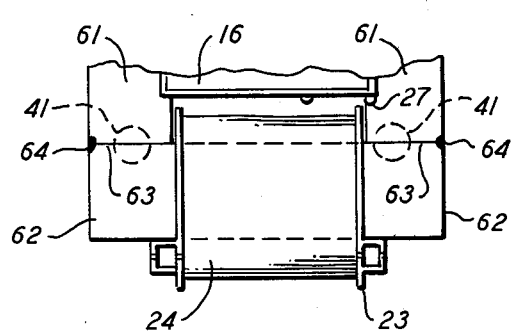

In FIG. 9, the leg ends 61 meet the sides of the polepiece ends 62 in a straight line 63 at each polepiece end, the lines 63 diverging from the direction in which the parallel legs 61 extend from their integral ring portion 15 at an angle of 90°.

In each of the above three figures it will be noted that the respective polepiece ends are no wider in a longitudinally extending direction than the portion of the polepiece extending through the axially extending hole through the spindle of the bobbin 23. In each of these same three figures the respective laminae of the leg ends and those of the polepiece ends are joined together by a weld across the outer edges of the laminae at the outer ends of the respective lines 57,58 and 63 at a point designated 64 in each drawing.

Figure 10:
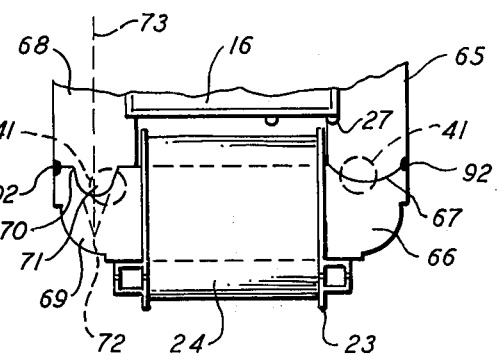
Figure 11:
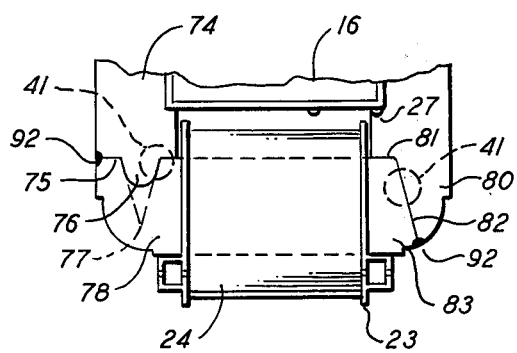
Figure 12:
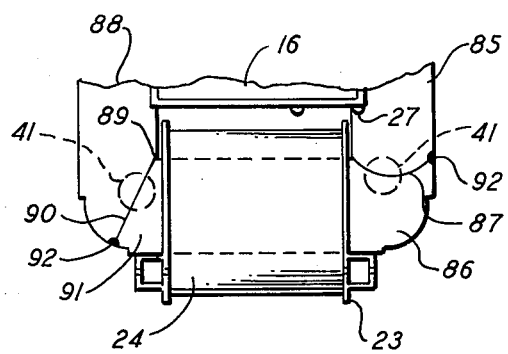

Referring now to FIGS. 10-12 inclusive it will be apparent that it may become desirable to join the polepiece ends to the leg ends along lines which differ at each end of the polepiece. It will also be apparent that it may be desirable that the line along which one leg end is joined to its mating polepiece end may have a projection at one leg end mating with a similar recess in the polepiece end. This may require a more accurate shaping of the laminated leg ends and the mating side or end of the polepiece end but the same principles and techniques applied to leg ends and polepiece ends of FIGS. 3, 7, 8 and 9 may be used.

In FIG. 10, the leg end 65 at the right of the figure meets a mating polepiece end 66 along a line 67 which is curved from side to side similar to the lines 58 of FIG. 8. The line 67 is a continuous arcuate curve from side to side of the leg 65 which is less than a semicircle so that the curved line of the recess in polepiece end 66 is continuously opening outward for a mating fit with the curved end of leg 65 without excessive pressure of the two parts together.

The leg 68 at the left of FIG. 10 meets the left end 69 of the polepiece along a line 70 which is partly straight and partly curved. The straight parts of line 70 at either side of leg 68 are substantially aligned at an angle of 90° to the direction in which leg 68 extends and between the straight parts there is a curved projection 71 projecting into a mating recess in the side of polepiece end 69. Lines 72,72 drawn tangent to the ends of the curved projection 71 where it meets the straight portions of line 70 show that the mating curved recess in end 69 of the polepiece diverge at an angle to the line in which leg 68 projects which is more than 5° to the center line 73 of projection 71. The recess in the polepiece end 69 is therefor continuously open with no constriction resulting in minimal pressure in the direction of arrows 40 of FIG. 3 necessary to bring the end 69 of the polepiece into contact with the end of leg 68.

Referring now to FIG. 11, the outer end 74 of the left-hand leg terminates in a line 75 which is part straight and part curved with a projection 76 extending down from leg 74 like the projection 71 from leg 68 in FIG. 10. Lines 77 drawn tangent to the ends of the mating curved recess in the side of the polepiece end 78 show that the recess is continuously open for minimal pressure requirements to bring the polepiece end 78 into contact with the leg end 74.

The leg end 80 at the right of FIG. 11 is recessed along a straight line 81 not necessarily at right angles to the line in which leg 80 projects and along another straight line 82 extending at an angle to line 81 and at an angle to the direction in which leg 80 projects from the circular portion 15 of the stator. Line 82 extends generally longitudinally downward from the leg 80 but angled outwardly toward the right-hand side of leg 80 for minimal pressure toward leg 80 to bring the right-hand end 83 of polepiece into full contact with the line 81–82 at the end of leg 80.

Referring to FIG. 12, the leg 85 shown at the right has its end rounded and is in contact with a rounded depression in the upper side of the right-hand end 86 of the polepiece, the two parts mating along an arcuately curved line 87 similar to the line 67 in FIG. 10. It will be noted that the curved line 87 is less than a semicircular arc and the two parts can be brought together with minimum pressure in the direction of the arrows 40 in FIG. 3 and resistance in the opposite direction.

The leg 88 at the left in FIG. 12 has a recess facing leg 85 formed by a short straight line 89 and a longer straight line 90 similar to that shown at 38–37 at the left in FIG. 3 in mating with the left end 71 of the polepiece.

In each of the FIGS. 10–12, the laminae of the stator legs and the laminae of the polepiece ends are secured together by a continuous weld 72 across the edges of the laminae at the outer ends of the lines 67, 70, 75, 82, 87 and 90.

It will be noted that the ends 56, 60, 62, 66, 69, 78, 83, 86 and 91 are no wider measured in a direction longitudinally of the motor than the portion of each polepiece passing through the axially extending hole through the spindle of bobbin 23. It will be apparent, however, that protuberances like 71 in FIG. 10 and 76 in FIG. 11 could project up into mating sockets in the leg ends 68 and 74 beyond the line extended of the axial hole through bobbin 23 if the opposite ends 66 and 83 of the polepieces of FIGS. 10 and 11 were no thicker measured in a direction extending longitudinally of the motor so that the laminae of the polepieces could be inserted in the axial hole through bobbin 23. The polepiece end configurations shown in FIGS. 7–12, however, are believed to be structurally stronger due to the positions of the welds along the outer edges of the laminae at the end of the juncture lines between stator legs and polepiece ends. The ever widening divergence of the socket portions of the contact lines between stator leg portions and polepiece end portions shown are important for obtaining good contact with minimum pressure in opposite directions aligned with the direction in which the legs extend.

We claim:

1. In a small shaded pole electric motor having a two-portion stator comprising a first laminated portion having two integral parallel spaced leg portions projecting in the same direction therefrom, and a second laminated elongated polepiece portion fitting closely within a field coil support having a field coil wound therearound, each laminated portion comprising a plurality of identical laminations all of the same thickness and piled together to form the respective stator portion, the ends of the legs of the first portion each terminating along a continuous contact line thereacross, the ends of the polepiece portion extending beyond the field coil support, the projecting ends of the polepiece portion each having a continuous contact line reversely similar and complementary to the contact line of its corresponding leg portion for mating therewith along the entire contact line when the piled laminations of the projecting ends of the polepiece portion and the piled laminations of the legs of the first portions are temporarily held together and advanced toward one another in a direction diammetrically opposite to the direction in which the legs project while the piled laminations are guided on a common flat surface on which the laminations lie lowermost face down, each contact line for each leg and its corresponding polepiece end lying along a line which continually diverges laterally and outwardly endwise of the leg at an angle to the contact line between the other leg and its corresponding polepiece end, whereby contact between each leg and corresponding polepiece end is made instantaneously all along the contact lines, each leg and its corresponding polepiece end being thereafter strip welded together at the outer end of their contact line, the strip weld extending across the edges of the laminations of both portions for securing together the laminations of both portions as well as securing the portions together.

2. The two-portion stator defined in claim 1 wherein at least one of the contact lines between a leg and its corresponding polepiece end is straight, the straight contact line extending at an angle to the direction in which the leg projects, the angle being 5° to 90° to the direction of projecting.

3. The two-portion stator defined in claim 1 in which at least one of the contact lines between a leg and its corresponding polepiece end is arcuately curved, a straight line drawn through the opposite ends of the curve extending at an angle to the direction in which the leg projects, the angle being 5° to 90° to the direction of projecting.

4. The two-portion stator defined in claim 1 wherein at least one projecting polepiece end is of less width when measured longitudinally of the motor than the polepiece portion contained in the tubular coil support.

5. The two-portion stator defined in claim 1 in which the contact line between at least one leg and its corresponding polepiece portion has at least a part thereof which is straight, the straight part diverging outwardly and laterally of the leg portion at an angle to the direction in which the leg projects, the angle being between 5° and 90°.

6. The two-portion stator defined in claim 4 in which the contact line between at least one leg and its corresponding polepiece portion has at least a part thereof which is straight and a part thereof which is curved, the straight part diverging outwardly and laterally of the leg portion at an angle to the direction in which the leg projects, the angle being between 5° and 90°, and the curved part defining a projection from one portion and a mating socket in the other portion terminating in diverging lines tangent to the ends of the curve, each diverging tangent line being at an angle to the direction in which the leg projects, the angle being between 5° and 90°.

7. The two-portion stator defined in claim 1 in which the contact line between at least one leg and its corresponding polepiece portion has at least a part thereof which is curved, the curved part defining a projection from one portion and a mating socket in the other portion terminating in divergent lines tangent to the ends of the curve, each divergent tangent line being at an angle to the direction in which the leg projects, the angle being between 5° and 90°.

8. In a small shaded pole electric motor having a two-portion stator comprising a first laminated portion having two integral parallel spaced leg portions projecting therefrom in the same direction, and an elongated laminated polepiece portion fitting closely within a tubular field coil support having a field coil wound therearound, each laminated portion comprising a plurality of identical laminations all of the same thickness and piled together to form the respective stator portion, the legs of the first portion each having a recess at its end facing a like recess in the other leg, the recesses each having sides which form continuous contact lines which diverge continuously outwardly laterally of the legs at an angle of at least 10° to the direction in which the legs project, the polepiece ends projecting beyond the coil support and each terminating in a contact line reversely complementary to the sides of its respective leg recess whereby, when the piled laminations of the polepiece ends and the piled laminations of the legs are temporarily held together and advanced toward one another in a direction opposite to the direction in which the legs project while the piled laminations are guided on a common flat surface on which the laminations lie lowermost face down, the polepiece ends and legs meet when the portions are press fitted together, the laminations of both portions being later secured together by a strip weld across the edges of the laminations at the outer ends of the contact lines for securing together the laminations of both portions as well as securing the portions together, the polepiece portion having at least one end which is of less width measured longitudinally of the motor than the polepiece portion contained in the tubular coil support.

* * * * *